Sept. 13, 1949.    J. L. HEMP    2,481,664
INSULATED CONTAINER
Filed March 19, 1945

Inventor
Joseph L. Hemp,
By Spencer, Marzall, Johnston & Cook, attys

Patented Sept. 13, 1949

2,481,664

UNITED STATES PATENT OFFICE 2,481,664

INSULATED CONTAINER

Joseph L. Hemp, Macomb, Ill.

Application March 19, 1945, Serial No. 583,628

1 Claim. (Cl. 220—15)

This invention relates to insulated containers, such as bottles, jars and the like, and to the method of making the same.

The primary object of the invention is the provision of a new and improved insulated container wherein there is provided an inner container or liner arranged within an outer housing or casing, there being insulation arranged between the inner liner and the outer casing, the inner liner and outer casing being maintained in locked position and under pressure by means of a bottom member constantly urging the inner liner into contacting engagement with a part of the outer casing.

Another object of the invention is the provision of an insulated container having an inner liner and an outer casing, there being insulated material of a predetermined kind for insulating the space between the liner and the casing throughout a major part of the container, and insulating material of a different type for insulating the space between the liner and casing throughout the remaining part of the space.

A still further object of the invention is the provision of a container which has the parts arranged and located in a particular manner, which is provided with novel means for insulating the space between the inner liner and outer casing, and which has the parts so constructed and arranged to permit ease of application of the insulation as well as in assembling the entire container.

Still another object of the invention is the provision of a new and novel method of making an insulated container wherein the inner liner is provided with an offset flange engageable with a flat part of the outer casing so as to effect a tight joint between the two members, there being insulating material of two different kinds in the space between the inner liner and the outer casing, means being also provided to create an urging action against the inner liner so as to maintain a tight contact between the inner liner and the outer casing.

Numerous other objects and advantages will be apparent throughout the progress of the following specification.

Figure 1:
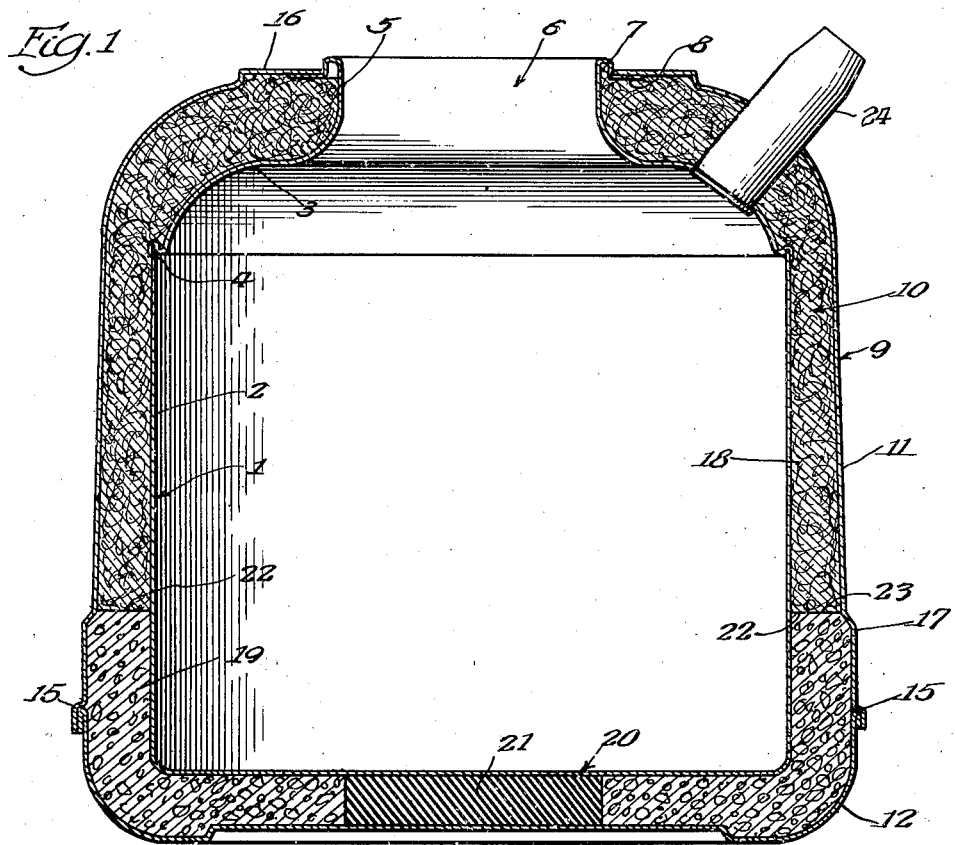
Figure 2:
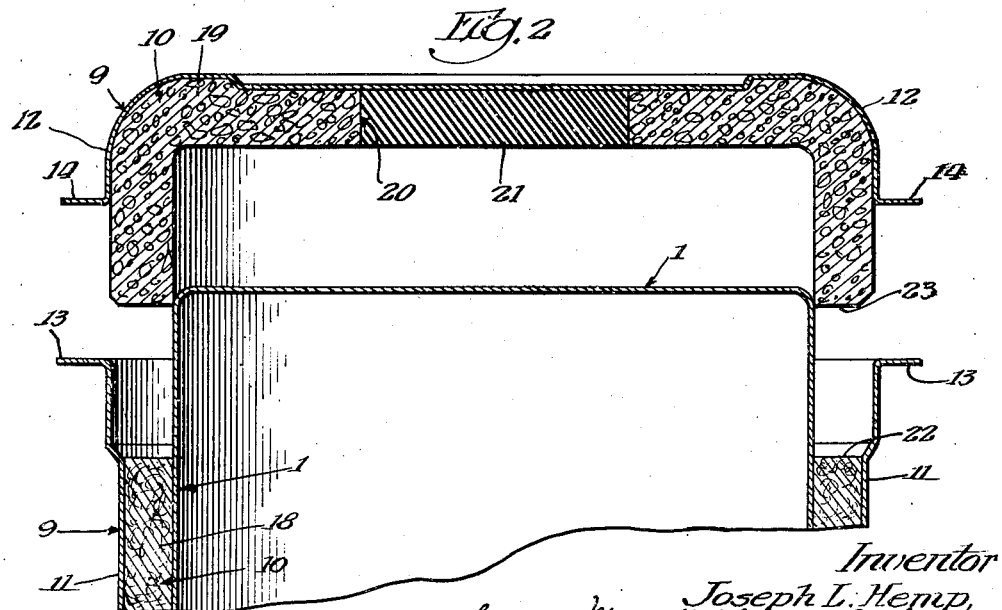

The accompanying drawing illustrates a selected embodiment of the invention and the views therein are as follows:

Fig. 1 is a detail vertical sectional view of a vacuum type container and embodying the invention; and Fig. 2 is a fragmentary sectional view of the container in an inverted or upside down position.

The particular container herein shown for the purpose of illustrating the invention comprises an inner liner 1 which may be made in a lower section 2 and an upper section 3 secured together, as at 4, by means of an interlocking seam. The liner 1 is preferably made of metal and may have its entire inside surface coated with suitable material, such as vitreous enamel. The inner liner 1 terminates in an upwardly extending neck 5 defining a central opening 6. The material of the liner about the neck 5 extends upwardly in the form of an annular bead 7 surrounding the opening 6. The upper end of the liner terminates in an outwardly extending annular flange 8.

An outer casing 9 is adapted to encase the liner 1 and is arranged concentrically about the liner 1, there being an annular space between the casing 9 and the liner 1 to receive insulating material. The casing 9 is adapted to be made in two parts comprising the upper part 11 and the lower part 12. The upper part 11 and the lower part 12 terminate in outwardly projecting flanges 13 and 14 which are adapted to be crimped over to form a flat peripheral seam 15. The upper part 11 of the casing 9 has its upper end formed into an inwardly extending flat annular flange or flange-like portion 16 which overlaps the flange 8 on the liner and extends up to the bead 7.

The lower part of the casing 9 may be enlarged at its lower end at the point indicated at 17, and the insulation 10 above the point 17 may be of one kind of material while the insulation below the point 17 may be of another kind of material. It has been found desirable that the insulation used for the upper part of the container be a silica gel of the kind known under the trade name of "Santo-Seal." This silica gel, which is indicated by the numeral 18, fills the space between the inner liner 1 and the outer casing 9 from a point upwardly from the point indicated by the numeral 17. The insulation for the lower part of the container, that is, that part of the container below the point 17, may comprise molded cork 19. The molded cork insulation part 19 is of a substantially cup-shaped formation so that it also covers the bottom of the liner, as clearly shown in Figs. 1 and 2, but has a central opening 20 provided in the bottom thereof to receive a rubber or rubber-like plug 21. This rubber or rubber-like plug 21, when the parts are assembled, is placed under tension and operates to urge the inner liner 1 in a direction with respect to the outer casing so that the flange 8 on the inner liner 1 will always be forced tightly into complemental engagement against the underside of the peripheral flange 16 on the outer casing 9.

It has been found that by employing this particular construction it is possible to provide proper insulation about the neck of the container and that the conventional method of securing the inner liner to the outer casing by means of melted sulphur may be dispensed with. Moreover, it has been found desirable and advantageous to have the inner liner 1 really supported on the insulation between the outer casing and the inner liner instead of hanging the inner liner about its neck. Greater and better insulation is provided by the use of the particular insulating material used, and by the overlapping of the flanges 8 and 16 with a constant pressure exerted thereagainst by means of the bottom rubber plug 21.

The container is assembled by first placing the upper part 11 of the outer casing 9 about the upper end of the liner 1 with the flanges 8 and 16 in overlapped position. The container is then inverted, as shown in Fig. 2, and the silica gel is filled in the space between the part 11 of the casing 9 and the upper part of the liner. The silica gel is filled to the point defined by the flange 13 in Fig. 2. The divided silica gel is then tamped and forced tightly into the space between the inner liner and the outer casing until the silica gel will extend to the point indicated at 22, Fig. 2. The molded cork insulation part 19, with the lower section 12 mounted thereover, and the plug 21 arranged in place, is then slipped downwardly over the bottom of the liner 1, as shown in Fig. 2, until the flanges 13 and 14 contact. The flanges 13 and 14 when in contacting arrangement will bring the end 23 of the molded cork part 15 tightly against the peripheral edge 22 of the silica gel whereupon the entire space between the liner and the casing will be completely insulated. The contacting flanges 13 and 14 are then locked together into the flat seam 15 whereupon the entire container is fully assembled with the flanges 8 and 16 in contacting relationship and constantly urged together by means of the rubber plug 21.

The container may be provided with a pouring spout 24 at or near the upper end of the container. The spout is arranged at an angle to the container to permit for easy pouring as well as to permit for easy assembly. The spout is secured to the inner liner at a proper angle to permit easily the outer casing to be slipped over. If desired, a pouring faucet (not shown) may be arranged at or near the bottom of the container. However, this faucet is applied preferably after the assembly, there being a hole provided in the liner to receive the faucet. The hole in the liner will, of course, align with a hole formed in the casing to permit the assembly of the faucet in place.

The invention provides a unique method of arranging the insulation of a container as well as a novel means of arranging the parts in position and assembling the parts together. The entire device is insulated throughout and the liner, instead of being suspended at its neck in the conventional manner, is supported on its bottom by resting upon a resilient rubber plug which urges the liner into contacting position with the outer casing near the neck of the container. The opening 6 may be closed by a suitable closure member.

Changes may be made in the form, construction and arrangement of the parts without departing from the spirit of the invention or sacrificing any of the advantages thereof, and the right is hereby reserved to make all such changes as fairly fall within the scope of the following claim.

The invention is hereby claimed as follows:

A double walled container comprising a metallic inner liner including an enclosing wall portion, a circular bottom portion and a tubular neck portion, said neck portion being formed with an outwardly extending annular flange; an outer metallic casing receiving the inner liner in spaced relation and cooperating therewith to provide a continuous annular jacket space around the bottom, wall and neck portions of the inner liner, said outer casing being formed with an inwardly extending flange complementally engaging the upper face of the flange on the neck portion of the liner; a molded cork member of cup-shape formed with a central recess in its bottom portion, said member filling the jacket space between the bottom and the lower wall portions of the liner and casing except for said central recess; a packed mass of divided insulation filling the remainder of the jacket space between the wall and neck portions of the liner and casing; and a rubber-like plug fitted within the central recess of the cork member and engaging the adjacent portion of the liner, said plug being under tension and acting constantly to hold said flanges in complemental engagement.

JOSEPH L. HEMP.

REFERENCES CITED

The following references are of record in the file of this patent:

UNITED STATES PATENTS

| Number | Name | Date |
| --- | --- | --- |
| 1,000,172 | Hopkins | Aug. 8, 1911 |
| 1,029,364 | Hartwig | June 11, 1912 |
| 1,354,712 | Altenberg | Oct. 5, 1920 |
| 1,605,740 | Johnson | Nov. 2, 1926 |
| 1,639,529 | Payson et al. | Aug. 16, 1927 |
| 1,684,399 | Lamb et al. | Sept. 18, 1928 |
| 1,900,306 | Shirley | Mar. 7, 1933 |
| 2,054,754 | Kellogg | Sept. 15, 1936 |
| 2,060,941 | Kline et al. | Nov. 17, 1936 |
| 2,179,542 | Claxton et al. | Nov. 14, 1939 |
| 2,386,958 | Jackson | Oct. 16, 1945 |

FOREIGN PATENTS

| Number | Country | Date |
| --- | --- | --- |
| 319,821 | Great Britain | Sept. 30, 1929 |